United States Patent
D'Andrea et al.

(10) Patent No.: US 9,217,082 B2
(45) Date of Patent: Dec. 22, 2015

(54) POLYMERIC FORMULATIONS WITH CHEMICALLY ADJUSTABLE RHEOLOGY FOR THE MANUFACTURE OF PREPREGS AND ARTICLES MADE OF COMPOSITE MATERIAL

(75) Inventors: Bruno D'Andrea, Velletri (IT); Anna Di Cosmo, Velletri (IT); Valeria Vinti, Torre del Greco (IT)

(73) Assignee: AVIO, S.p.A. (IT)

(*) Notice: Subject to any disclaimer, the term of this patent is extended or adjusted under 35 U.S.C. 154(b) by 128 days.

(21) Appl. No.: 14/008,151

(22) PCT Filed: Mar. 29, 2012

(86) PCT No.: PCT/EP2012/055740
§ 371 (c)(1),
(2), (4) Date: Sep. 27, 2013

(87) PCT Pub. No.: WO2012/131009
PCT Pub. Date: Oct. 4, 2012

(65) Prior Publication Data
US 2014/0011918 A1    Jan. 9, 2014

(30) Foreign Application Priority Data
Mar. 29, 2011  (IT) .............................. TO2011A0283

(51) Int. Cl.
| | | |
|---|---|---|
| C08J 5/24 | (2006.01) | |
| B32B 27/04 | (2006.01) | |
| B32B 27/38 | (2006.01) | |
| B32B 27/40 | (2006.01) | |
| C08G 18/80 | (2006.01) | |
| C08L 63/00 | (2006.01) | |
| C08G 18/69 | (2006.01) | |
| C08G 18/40 | (2006.01) | |
| C08G 18/28 | (2006.01) | |
| C08G 59/40 | (2006.01) | |
| C08L 75/04 | (2006.01) | |

(52) U.S. Cl.
CPC ............. *C08L 63/00* (2013.01); *C08G 18/4045* (2013.01); *C08G 18/698* (2013.01); *C08G 18/8061* (2013.01)

(58) Field of Classification Search
CPC ............. C08J 5/24; C08L 63/00; C08L 75/04; C08G 59/20; C08G 59/40; C08G 59/4021; C08G 18/06; C08G 18/28; C08G 18/72; C08G 18/80; B32B 27/04; B32B 27/38; B32B 27/40

USPC ............ 428/297.4, 413, 423.1; 523/427, 428, 523/466
See application file for complete search history.

(56) References Cited

U.S. PATENT DOCUMENTS

| | | | | |
|---|---|---|---|---|
| 4,923,934 | A | * | 5/1990 | Werner ........................ 525/528 |
| 5,308,895 | A | * | 5/1994 | Gan et al. ..................... 523/445 |
| 5,340,946 | A | | 8/1994 | Friedrich et al. |
| 5,521,262 | A | * | 5/1996 | Patel et al. .................... 525/528 |
| 6,153,709 | A | * | 11/2000 | Xiao et al. .................... 525/528 |
| 6,582,824 | B1 | * | 6/2003 | Weigl et al. .................. 428/413 |
| 2014/0039118 | A1 | * | 2/2014 | Renkel et al. ................. 524/590 |

FOREIGN PATENT DOCUMENTS

| | | |
|---|---|---|
| EP | 227002 | 7/1987 |
| WO | WO2007/064801 | 6/2007 |
| WO | WO2009/055666 | 4/2009 |

OTHER PUBLICATIONS

Technical Data sheet for D.E.R. 732, provided by Dow (no date).*
Technical Data sheet for D.E.R. 736, provided by Dow (no date).*
"Advances in Polymer Coated Textiles", published by Smithers Rapra Technology Ltd (2012): section 4.8 Kevlar, pp. 138-141.*
ISR and Written Opinion dated Jun. 29, 2012 for WO2012/131009.
Letter to EPO dated Feb. 27, 2013 in WO2012/131009.
Preliminary Report on Patentability dated Apr. 5, 2013 for WO2012/131009.

* cited by examiner

*Primary Examiner* — Michael J Feely
(74) *Attorney, Agent, or Firm* — Davidson Berquist Jackson & Gowdey LLP

(57) ABSTRACT

A polymeric formulation comprising at least one first epoxy resin having a density between 100 and 10,000 Pa·s, a blocked isocyanate, a polymer comprising hydroxy functional groups, a thermoplastic resin and a cross-linking agent, the polymer comprising hydroxyl functional groups with a hydroxyl content in the range 0.65 to 0.95 meq/g, the isocyanate-equivalents-to-polymer-OH-equivalents rate being in the range 0.60 to 1.1. The first epoxy resin is substantially semisolid at room temperature, the formulation comprising at least one second epoxy resin substantially liquid at room temperature, the first and second epoxy resins being present in a weight ratio from 60:40 to 80:20. These formulations are advantageously used for manufacturing prepregs and articles of composite material according to a dry winding process. By virtue of improved stability, a higher glass transition temperature, and a rheological profile result which can be chemically tailored to the needs of the impregnation/dry winding process.

4 Claims, 3 Drawing Sheets

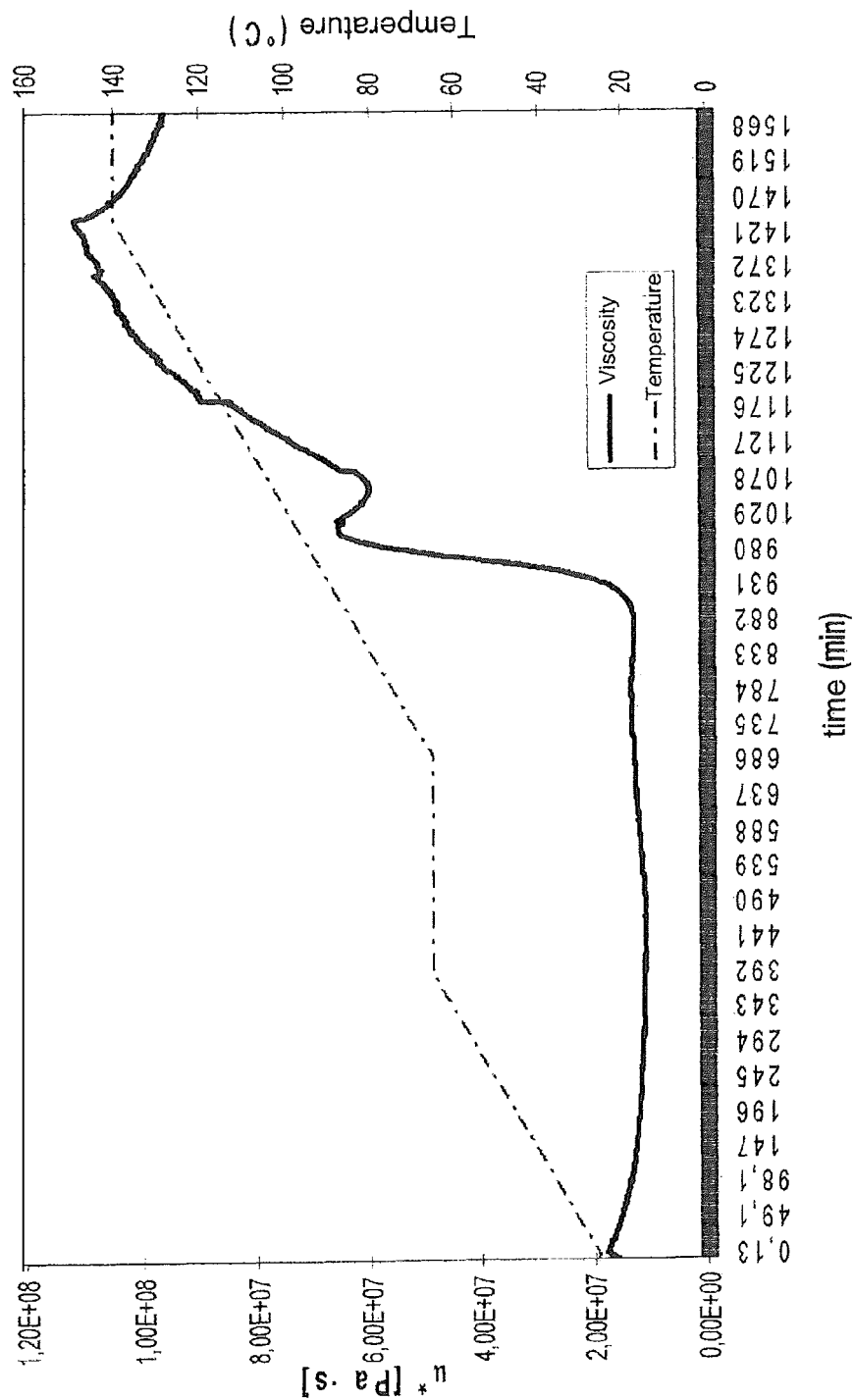

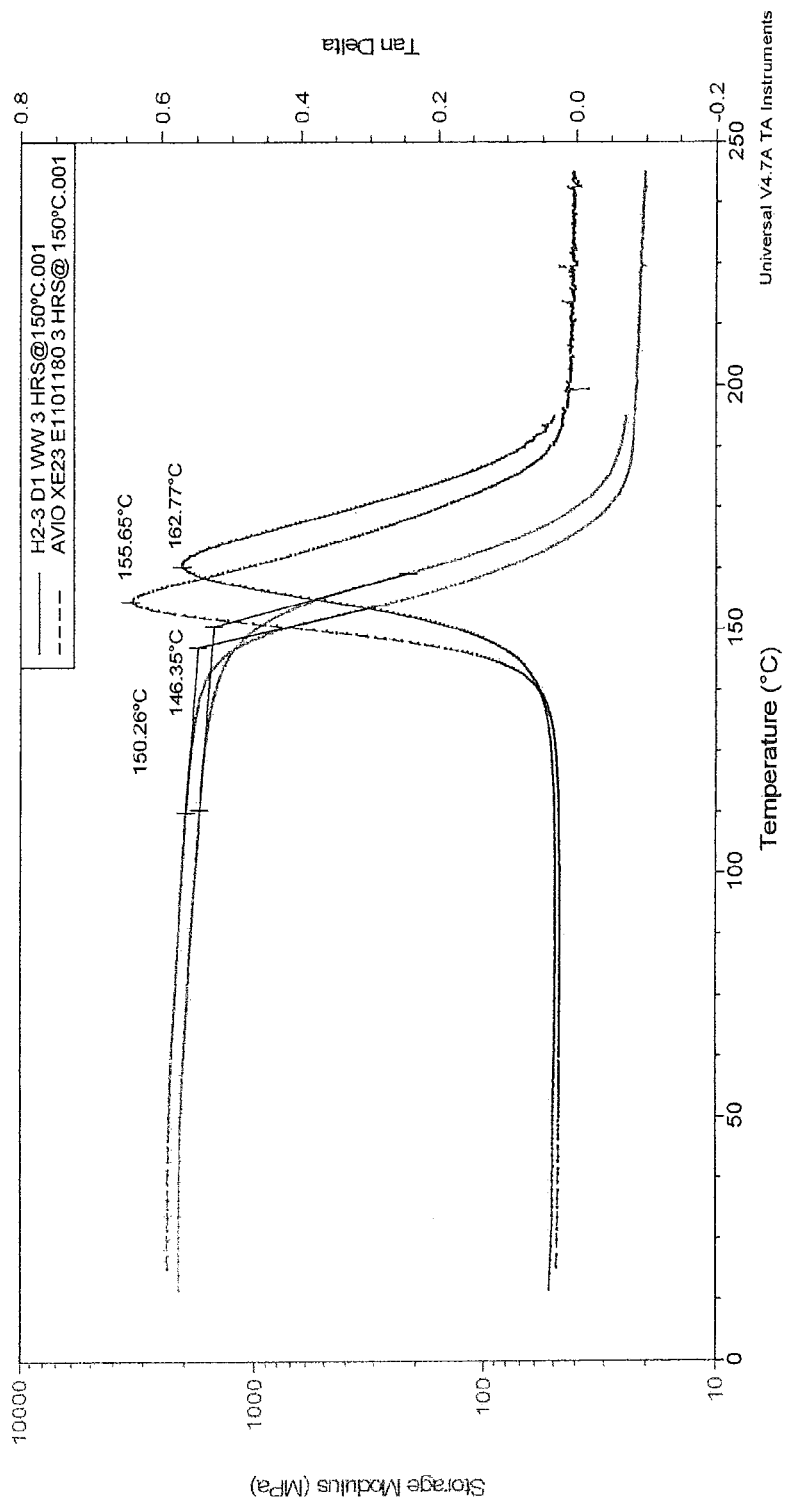
Figure 2 – Glass Transition
Tg recorded after curing cycle >150°C

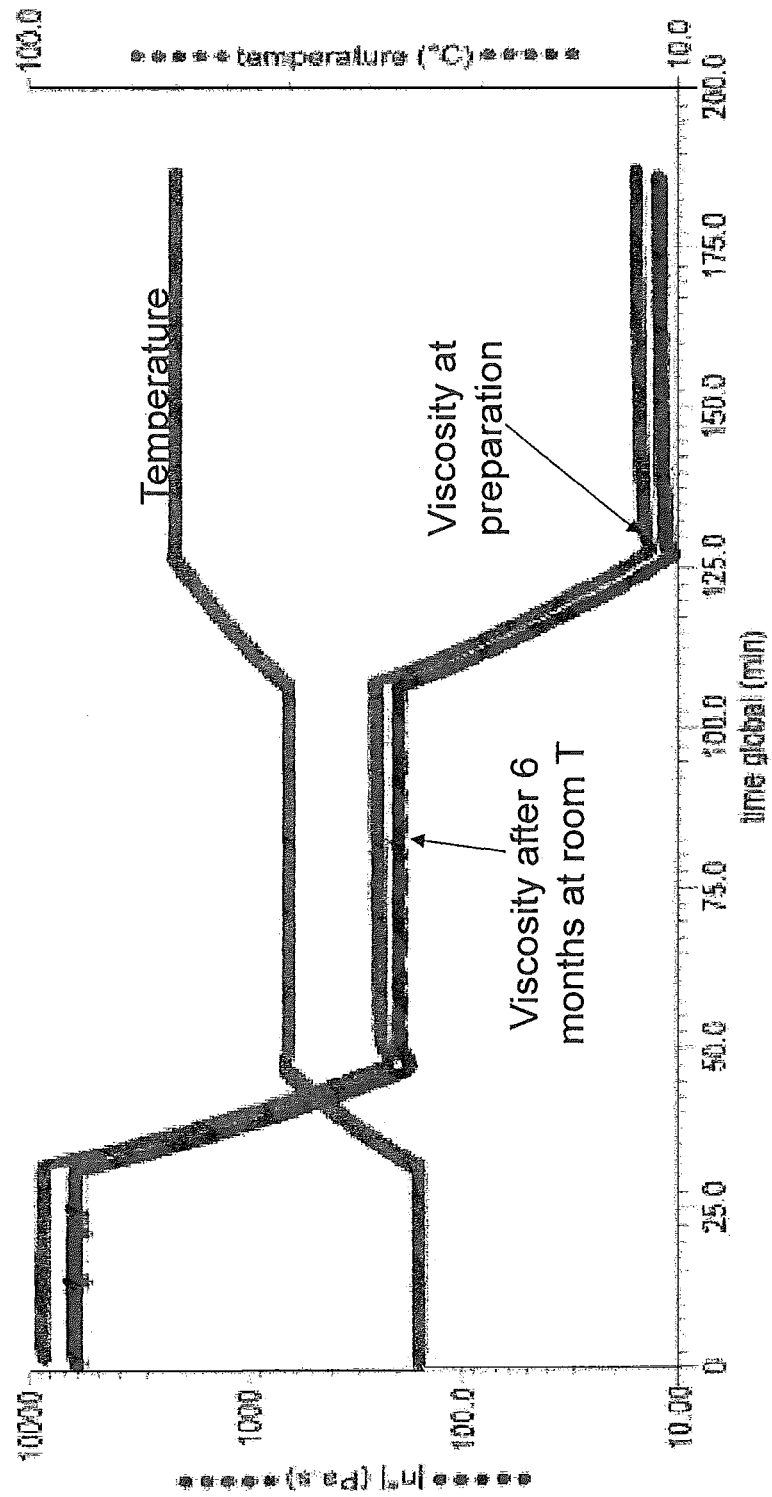
Figure 3 – Rheological profile - stability

POLYMERIC FORMULATIONS WITH CHEMICALLY ADJUSTABLE RHEOLOGY FOR THE MANUFACTURE OF PREPREGS AND ARTICLES MADE OF COMPOSITE MATERIAL

TECHNICAL FIELD

The present invention relates to the manufacture of prepreg semi-finished products and composite casings of the type comprising fibres embedded in a polymeric matrix. More specifically, the present invention refers to polymeric formulations, even more specifically epoxy resin based formulations, which can be used as a polymeric matrix for the manufacture of prepregs (for example based on carbon fibres, glass fibres, silicon carbide, etc.).

The invention furthermore relates to methods of production and uses of said polymeric formulations and said prepregs for the manufacture of articles made of composite material.

BACKGROUND ART

Components such as engine casings and other containers intended for use under pressure and made of a composite material having a polymeric matrix reinforced with fibres, are known, in particular in the aeronautical field. Typically, it is known that a manufacturing process based on the winding of fibres or filaments of fibres pre-impregnated with an appropriate polymeric formulation is used for said purpose. An analogous technology has been successfully used for the manufacture of tanks, pipe elements etc. having reduced weight.

Historically, glass fibres have been the most widely used fibres, but more recently other fibres, such as carbon filaments, boron filaments, and high modulus polymeric filaments, in particular aramidic, have been increasingly used in composite structures, thus advantageously exploiting their specific physical-chemical properties.

The resins most often used are typically epoxy-based resins and comprise bisphenol A diglycidyl ethers (BADGE), epoxy diluents with low molecular weight and cross-linking agents such as aliphatic and aromatic amines and anhydrides of carboxylic acids.

Similar polymeric compositions are known, e.g. from WO2009/055666 and U.S. Pat. No. 5,340,946, which disclose formulations comprising an epoxy resin, a blocked isocyanate, a polymer comprising hydroxyl functional groups and a latent cross-linking agent, in particular for the production of printed circuit boards.

In greater detail, WO2009/055666 is particularly concerned with providing polymeric compositions which display a good balance of properties and, in particular, a satisfactory dimensional stability upon heating (i.e. with a sufficiently high glass transition temperature) so that interaction with solders for the manufacture of circuit boards does not cause thermal expansion of the polymeric laminate in the direction perpendicular to the main plane in which the circuit shall lie.

Similarly, U.S. Pat. No. 5,340,946 is concerned with providing polymeric formulations for the manufacture of printed circuit boards which have improved temperature resistance. Even more particularly, formulations are provided which attempt to eliminate the so-called "swimming" of wire-conductors laid down in the resin prior to completion of the curing thereof.

However, printed circuit boards are not subjected, in use, to significant mechanical loads.

Therefore, WO2009/055666 and U.S. Pat. No. 5,340,946 provide no insight on other issues typically encountered when manufacturing composite components of the type comprising fibres embedded in a polymeric matrix, and which are, when in operation, required to withstand much greater loads and stresses, e.g. engine casings, tanks and other containers intended for use under pressure.

Different manufacturing processes are known in the art which entail the winding of a filament around a rotating spindle, the form of which determines the final geometry of the article produced, made of composite material.

According to a first process, called "wet winding", the fibre filaments are coated with the polymeric formulation contained by immersion in a bath containing the formulation. Immediately after the immersion, the filaments are wound around the spindle to form the desired structure. The structure thus obtained by winding subsequently undergoes cross-linking.

Alternatively, in a second process called "dry winding", prepregs, or semi-finished products consisting of fibre filaments previously impregnated in the polymeric formulation are wound around the spindle. Also in this case, the structure obtained by means of the winding subsequently undergoes cross-linking. However, for implementation of this second process, it is necessary for the prepreg to have a given stability, i.e. between manufacture and subsequent winding to produce the article made of composite material, it must be possible to easily store the prepreg in a warehouse for a reasonably long period. In other words, the prepreg must have a sufficiently long shelf life also when it is stored at room temperature (so called "out-life").

In particular, the need is felt in the field for a polymeric formulation for the manufacture of prepregs and articles made of composite material which have a shelf life of at least 5-6 months.

At the same time, polymeric formulations for the manufacture of prepregs and articles made of composite material that possess rheological characteristics fully compatible with the different phases of the manufacturing process and the relative operating conditions (temperature, activation of the cross-linking process, etc.) are highly desirable.

In fact, it must be taken into account that, in the different phases of the process, it is desirable for the rheological behaviour of the polymeric formulation to be progressively adjustable. In particular, in a first phase, the formulation should be sufficiently fluid to wet the fibre filaments, but also sufficiently viscous for the prepreg to be stored stably for a long time before being wound.

In this sense, the need is felt in the sector for a polymeric formulation for the manufacture of prepregs and articles made of composite material which have a higher glass transition temperature than the known formulations.

Furthermore, to ensure workability in the winding phase, it is desirable for the viscosity of the formulation to increase during the winding to a sufficient extent to permit interruption of the spindle rotation. Lastly, it must be possible to cross-link the formulation at the end of the winding phase.

The need is therefore felt in the sector for a polymeric formulation for the manufacture of prepregs and articles made of composite material, the rheological behaviour of which can be adjusted according to the requirements of the production process summarily described above.

Further to the needs mentioned above, in order to improve the mechanical performances of the cured composite and, at the same time, minimize the amount of processing scrap (in terms of fully manufactured components that need to be discarded for failure to comply with certain production requirements), the need is felt in the field for polymeric formulations capable of providing adequate elongation at break values.

Good values of elongation at break of the polymeric formulation would make it possible to obtain a good coefficient of transfer of loads from the polymeric matrix (epoxy resin) to the embedded fibres in the cured composite. This is particularly desirable and relevant in those cases where even small defects (such as the presence of cavities or delamination phenomena) in the cured components,—defects which are, however, substantially inherent with the filament winding technology—would cause the load to be transferred only to the layers with no defects and not to adjacent defective layers, in consequence of the insufficient deformation of the polymeric matrix with respect to the reinforcing fibres. This non-uniform distribution of loads can, as shall be understood, cause damages and significantly reduce the life of the component, which is likely to be more prone to quick deterioration.

DISCLOSURE OF INVENTION

The object of the present invention is therefore to provide a polymeric formulation for the manufacture of prepregs and articles made of composite material, which meets at least one of the above requirements in a simple, inexpensive manner.

The above-mentioned object is achieved by the present invention, since it relates to a polymeric formulation for the manufacture of prepregs and articles made of composite material as defined in claim 1.

BRIEF DESCRIPTION OF THE DRAWINGS

For a better understanding of the present invention, a preferred embodiment is described below, purely by way of non-limiting example and with reference to the accompanying drawings, in which:

FIG. 1 is a diagram which illustrates the trend of the rheometric profile according to the temperature of a formulation according to the invention;

FIG. 2 is a diagram illustrating the results of a dynamic-mechanical analysis test for determination of the glass transition temperature of a formulation according to the invention; and FIG. 3 is a diagram which compares the trend of the rheometric profile according to the temperature for a formulation according to the invention shortly after preparation and six months after preparation.

BEST MODE FOR CARRYING OUT THE INVENTION

A polymeric formulation is provided comprising at least one first epoxy resin having viscosity between 100 and 10,000 Pa·s, a blocked isocyanate, a polymer comprising hydroxyl functional groups, and a cross-linking agent.

In particular, the viscosity of the first epoxy resin is selected so as to guarantee a satisfactory compromise between the fluidity necessary to wet the fibres during the filament impregnation phase and the need to minimise dripping and other manufacturing defects.

It should be remembered that to impregnate a fibre filament, the polymeric formulation must be previously mixed, followed by a so-called "filming" phase, in which the mixed formulation is spread to form a thin layer (film) on paper, typically followed by a cooling phase.

The filmed paper is then heated for application to the fibre filaments (actual impregnation).

An alternative method is also quite common in the art, according to which a dry, wounded fibre is directly impregnated with molten resin (dry winding). This has been found to be advantageous for the production of single tows, in view of lower costs and greater productivity, whereas the method described above and involving the filming phase is more commonly used for producing a so-called "tape".

It should be noted that the viscosity of the epoxy resin could be easily lowered by increasing the temperature at which the impregnation phase is performed. However, if the temperature is over-increased, there is the risk of destabilising the epoxy resin activating the cross-linking process.

Furthermore it should be noted that, given the need to store the prepreg in a warehouse for 5-6 months, storage at room temperature is desired. For said purpose, it is desirable for the formulation to have the highest possible glass transition temperature, compatibly with the fibre wettability requirements.

Advantageously, the polymer comprising hydroxyl functional groups has an hydroxyl content in the range 0.65 to 0.95 meq/g, preferably in the range 0.70 to 0.92 meq/g.

Furthermore, in the polymeric formulation, the isocyanate-equivalents-to-polymer-OH-equivalents ratio (also referred to as "cure level", NCO equivalents/OH equivalents) is advantageously in the range 0.60 to 1.1, preferably in the range 0.7 to 1.0.

The polymer comprising hydroxyl functional groups is, for example, a hydroxyl terminated polybutadiene, type R45HT. Preferably, the polymer comprising hydroxyl functional groups is present in the formulation in a weight percentage from 0.1 to 35 phr, more preferably from 6 to 30. Note that "phr" stands for "parts per hundred parts of resin".

As shall be shown in greater detail by means of experimental data in the Examples, polymeric formulations having these properties display greatly improved elongation at break values (from an initial value of about 3.0% to a maximum value of over 8.0%).

The blocked isocyanate can be Baxenden BI 7982 or BI7963. Preferably, the blocked isocyanate is present in the formulation in a weight percentage from 0.1 to 15 phr, more preferably from 2 to 10 phr.

The blocked isocyanate performs an important function in the formulation of the invention, which will become clearer from the description of the behaviour in use of the formulation given below.

The cross-linking agent is preferably dicyanamide or diaminophenylsulfone DDS or DADPS.

Preferably, the first epoxy resin is substantially solid or semi-solid at room temperature, and the formulation comprises at least one second epoxy resin substantially liquid at room temperature, the first and the second epoxy resin being present in the formulation in a weight ratio of between 60:40 and 80:20.

In this way, it is possible to advantageously adjust the starting viscosity of the formulation by modifying the weight ratio between the first and second epoxy resin.

Even more preferably, the formulation can furthermore comprise a diluent, such as a cycloaliphatic resin up to 25% in weight, the introduction of which provides a further degree of freedom in modulation of the starting viscosity and density of the formulation.

For example, the first epoxy resin can be a bifunctional liquid DGEBA resin, such as Hexion Epon 828 or Huntsman MY750. Preferably, the first epoxy resin is present in the formulation in a weight percentage between 40 and 90%, more preferably between 50 and 80%.

For example, the second epoxy resin can be a bifunctional solid DGEBA resin, such as Hexion Epon 1001F or Huntsman GT7071. Preferably, the second epoxy resin is present in the formulation in a weight percentage between 10 and 60%, more preferably between 20 and 50%.

For example, the resin that performs the reactive diluent function can be a cycloaliphatic resin such as Huntsman DY-D/CH, or C/Y-179 or CY-184. Preferably, the diluent resin is present in the formulation in a weight percentage up to 25%.

Preferably, the formulation furthermore comprises a thixotropic agent. More preferably, the thixotropic agent is present in the formulation in a weight percentage from 0.1 to phr, more preferably from 1 to 3 phr. For example, the thixotropic agent can be DEGUSSA Aerosil R972.

The thixotropic agent has the advantageous effect of facilitating mixing of the formulation upstream of the filming operations and impregnation of the fibre filaments, at the same time reducing the occurrence of undesired dripping of formulation from the fibre filaments during the impregnation phase.

The formulation can furthermore comprise a multifunctional resin such as Huntsman Tactix 742 or Huntsman MY0510.

The formulation of the invention is advantageously used in the manufacture of prepregs.

In particular, said prepregs can be obtained by impregnating with a formulation of the invention filaments of fibres selected from the group consisting of glass fibres, Kevlar® (poly-paraphenylene terephthalamide), boron, nitrides, silicon carbide, carbon, high modulus polymers and their mixtures.

The prepregs thus obtained can be advantageously used for the manufacture of articles made of composite material by means of a dry winding process.

The diagram in FIG. 1 shows the trend according to temperature of the dynamic viscosity (in Pa·s) of a formulation according to the invention.

The viscosimetric profile of the formulations of the invention (FIG. 1) is particularly suitable for the preparation of prepregs (resin mixing, resin storage, stratification of the resin on paper and impregnation of the fibres, as described previously) due to the presence of an epoxy resin having a predetermined viscosity or a solid/liquid epoxy resin mixture, if necessary with the addition of a thixotropic agent and a thermoplastic polymer.

Also, for the production of single tows, in view of lower costs and greater productivity, the formulation of the invention may also advantageously be used in a dry winding process.

The resulting formulation is consequently solid or semi-solid at room temperature (thus avoiding the possibility of dripping of the resin), while it fluidizes at temperatures between 30 and 60° C. allowing both filming and impregnation of the fibres.

FIG. 2 shows the results of a dynamic-mechanical analysis for determination of the glass transition temperature of a formulation according to the invention. During the measurement, the formulation is first heated and brought from room temperature to 240-250° C. (modulus curve with Gaussian trend, the area below the curve corresponding substantially to the ΔH of the cross-linking reaction), after which it is left to cool and then heated again (decreasing sigmoid curve, the curve inflexion point corresponding to the glass transition temperature).

It is easy to see from the diagram of FIG. 2 that for a formulation according to the invention, the glass transition temperature is higher than 150° C.

During cross-linking of the prepreg, the viscosimetric profile is regulated by the presence of a blocked isocyanate, hydroxyl functionalities and a (latent) cross-linking agent.

In fact, the formulation of the invention allows three zones with different rheological-viscosimetric profiles to be obtained in the cross-linking phase:
  a first zone (temperature between 50 and 70° C.) in which the viscosity is low enough to permit excellent wettability of the various layers of prepreg; lowering of the viscosity is controlled by fluidization of the resin according to the temperature (physical bstage);
  a second zone (temperature between 70 and 100° C.) with intermediate viscosity (chemical bstage) which allows interruption of rotation of the spindle (for articles such as tanks) without dripping of the resin; the increase in the viscosity is due to the formation of a polyurethane as a result of polymerisation of the blocked isocyanate (stable at lower temperatures) with the polymer with the hydroxyl functionalities; and
  a third zone (temperature between 100 and 150° C.) with progressive increase in viscosity until complete hardening of the epoxy system by the latent curing agent.

Furthermore, the formulation of the invention is stable at room temperature for at least 6 months, as shown by the data given in FIG. 3.

FIG. 3 shows the trend of the dynamic viscosity of a formulation of the invention according to the temperature. The test, with the same thermal cycle, was performed on the formulation shortly after preparation and then repeated six months after preparation. It is easy to observe how the rheological behaviour of the formulation of the invention remains substantially unchanged, both in quality terms (general trend of the curve) and in quantity terms (plateau value of the dynamic viscosity at the various temperatures taken into consideration during the measurement).

Some examples of formulations according to the invention are given below. Furthermore, experimental data relating to measurements of mechanical performances—in terms of elongation at break of the cured resin—are provided in Table 1.

EXAMPLE A

1. Hexion Epon 828 (bifunctional liquid DGEBA resin or its countertype i.e. Huntsman MY750) in a percentage varying between 40 and 80%;
2. Hexion Epon 1001 F (bifunctional solid DGEBA resin or its countertype i.e Huntsman GT7071) in a percentage varying between 50 and 20%;
3. Huntsman DY-D/CH (cycloaliphatic resin as reactive diluent or its countertype i.e CY-179 and CY-184) in a percentage varying up to a max of 25%;
4. Thixotropic agent DEGUSSA Aerosil R972 in a percentage varying from 1 to 3 phr;
5. Dicyandiamide as cross-linking agent (in powder or paste);
6. Blocked isocyanate Baxenden BI 7982 (or alternatively others such as BI 7963) in a percentage varying from 2 to 10 phr;
7. Hydroxylated polymer (hydroxyl terminated polybutadiene such as R45HT) in a percentage varying from 6 to 30 phr.

EXAMPLE B

Same composition as Example A, but replacing component 5 (Dicyandiamide) with Diaminophenylsulfone (DDS or DADPS) in powder or paste.

EXAMPLE C

Same composition as Example A, but with the addition of a multifunctional resin such as Huntsman Tactix 742 or Huntsman MY0510.

EXAMPLE D

Same composition as Example D, but with the addition of a multifunctional resin such as Huntsman Tactix 742 or Huntsman My0510.

With particular reference to the formulation of Example A—similar considerations, however, extend to the rest of the Examples B to D provided above—different formulations shall display different mechanical behaviours in terms of elongation at break, depending on both "cross-linking density" and polyurethane percentage.

It should be borne in mind that polyurethane is formed through the reaction between isocyanate (delivered by the blocked isocyanate upon reaching the "un-blocking" temperature) and the polymer comprising hydroxyl functional groups with an hydroxyl content in the range 0.70 to 0.92 meq/g.

In particular, the following Table 1 contains data relating to some of the polymeric formulations tested for elongation at break. Tests were performed on the cured formulation.

TABLE 1

Elongation at break of cured polymeric compositions

|  | Compar. Example | Example A1 | Example A2 | Example A3 | Example A4 |
|---|---|---|---|---|---|
| Epon 828 | 44% | 44% | 44% | 44% | 44% |
| Epon 1001F | 44% | 44% | 44% | 44% | 44% |
| DY-D/CH | 12% | 12% | 12% | 12% | 12% |
| Aerosil R972 | 2 phr | 2 phr | 2 phr | 2 phr | 2 phr |
| Dicyandiamide (DiCy) | 6.35 phr (*) | 6.35 phr (*) | 6.35 phr (*) | 6.35 phr (*) | 6.35 phr (*) |
| blocked/R45HT mixture (cure level = 1)** | Not present | 15 phr | — | — | — |
| blocked/R45HT mixture (cure level = 0.7)** | Not present | — | 15 phr | — | — |
| blocked/R45M mixture (cure level 1.0)*** | Not present | — | — | 15 phr | — |
| blocked/R45M mixture (cure level 0.7)*** | Not present | — | — | — | 15 phr |
| ELONGATION AT BREAK (cured formulation) | 3.50% | 6.00% | 7.50% | 7.00% | 9.00% |

(*) Note: phr DiCy = (84.08 (MW hardener)/4 (number of active H DiCy/EEW resin) · 100 = 84.08/4/330.55 · 100 = 6.35
**Note: phr of blocked isocyanate and R45HT were calculated based on the respective equivalent weights, the relative ratio giving the desired cure level - reference was made to an equivalent weight of 410 for the blocked isocyanate (BI7982) and 1250 for R45HT
***Note: phr of blocked isocyanate and R45M were calculated based on the respective equivalent weights, the relative ratio giving the desired cure level - reference was made to an equivalent weight of 410 for the blocked isocyanate (BI7982) and 1430 for R45M Advantageously, with the formulations of the invention it is possible to prepare prepregs with stability higher than that of the standard prepregs on the market, which typically require storage at low temperature (−18° C.), since they are based on the use of resins which are solid at room temperature (such as DGEBA, novolak, multifunctional, cycloaliphatic, others and their mixtures) which fluidize due to the temperature (usually above 60° C.), allowing impregnation of the fibres and, by subsequent cooling, rewinding of the tow and the tape without resin dripping problems. Furthermore, the commercial systems are formulated with a fairly wide range of hardeners/catalysts (latent and non-latent cross-linking agents) which allow modulation, to a certain extent, of the hardening kinetics according to the applications for which they are intended.

The solution of the invention therefore allows significant savings on energy resources and reduction of waste in terms of material which is out of date.

Furthermore, the formulations of the invention advantageously allow a glass transition temperature to be obtained which is significantly higher than that of typical commercial systems (around 125° C.) and stability at room temperature for at least 6 months.

Finally, the formulations of the invention make it possible to obtain adequately high values of elongation at break for the cured resin, which result in greatly enhanced performances, from the mechanical standpoint, of the cured composite component. At the same time, the formulations of the invention compensate, to a very significant extent, defects which may be present in the cured composite component, thereby bringing about important advantages at both technical and economical level for the overall manufacturing process.

Lastly, it is clear that modifications and variations can be made to the formulations described and illustrated without departing from the protective scope of the independent claims attached.

The invention claimed is:

1. A method for manufacturing a prepreg comprising the steps of preparing a polymeric formulation comprising at least one first epoxy resin having a viscosity in the range between 100 and 10,000 Pa's, a blocked isocyanate, a polymer comprising hydroxyl functional groups and a latent cross-linking agent, wherein the polymer comprising hydroxyl functional groups has a hydroxyl content in the range 0.65 to 0.95 meq/g, the isocyanate-equivalents-to-polymer-OH-equivalents rate being in the range 0.60 to 1.1 and subsequently impregnating a fibre filament with the polymeric formulation.

2. A prepreg comprising a fibre filament impregnated with a polymeric formulation comprising at least one first epoxy resin having a viscosity in the range between 100 and 10,000 Pa's, a blocked isocyanate, a polymer comprising hydroxyl functional groups and a latent cross-linking agent, wherein the polymer comprising hydroxyl functional groups has a hydroxyl content in the range 0.65 to 0.95 meq/g, the isocyanate-equivalents-to-polymer-OH-equivalents rate being in the range 0.60 to 1.1.

3. The prepreg according to claim 2, wherein said fibres are selected from the group consisting of glass fibres, poly-par-aphenylene terephthalamide, boron, nitrides, silicon carbide, carbon, high modulus polymers and mixtures thereof.

4. A composite article formed by dry winding a prepreg comprised of a fibre filament impregnated with a polymeric formulation comprising at least one first epoxy resin having a viscosity in the range between 100 and 10,000 Pa's, a blocked isocyanate, a polymer comprising hydroxyl functional groups and a latent cross-linking agent, wherein the polymer comprising hydroxyl functional groups has a hydroxyl content in the range 0.65 to 0.95 meq/g, the isocyanate-equivalents-to-polymer-OH-equivalents rate being in the range 0.60 to 1.1.

* * * * *